(12) United States Patent
Beck et al.

(10) Patent No.: US 9,353,833 B2
(45) Date of Patent: May 31, 2016

(54) MULTI-SPEED GEARBOX

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/410,716

(22) PCT Filed: May 14, 2013

(86) PCT No.: PCT/EP2013/059875
§ 371 (c)(1),
(2) Date: Dec. 23, 2014

(87) PCT Pub. No.: WO2014/000940
PCT Pub. Date: Jan. 3, 2014

(65) Prior Publication Data
US 2015/0369341 A1    Dec. 24, 2015

(30) Foreign Application Priority Data
Jun. 26, 2012 (DE) .......................... 10 2012 210 841

(51) Int. Cl.
*F16H 3/72* (2006.01)
*F16H 3/66* (2006.01)
*F16H 3/44* (2006.01)

(52) U.S. Cl.
CPC ............ *F16H 3/66* (2013.01); *F16H 2003/445* (2013.01); *F16H 2200/0069* (2013.01); *F16H2200/2012* (2013.01); *F16H 2200/2046* (2013.01); *F16H 2200/2064* (2013.01); *F16H 2200/2094* (2013.01)

(58) Field of Classification Search
None
See application file for complete search history.

(56) References Cited

U.S. PATENT DOCUMENTS 3,863,524 A * 2/1975 Mori .................... F16H 3/66
475/276
4,027,551 A * 6/1977 Murakami ............. F16H 3/66
475/276

(Continued)

OTHER PUBLICATIONS

German Search Report, Feb. 6, 2013.

(Continued)

*Primary Examiner* — Dirk Wright
(74) *Attorney, Agent, or Firm* — Dority & Manning, P.A.

(57) ABSTRACT

The multi-speed transmission comprises four planetary gear sets eight rotatable shafts and six shifting elements. The sun gear of the first planetary gear set is connected to the fifth shaft, which is attachable to the housing through a third brake. The input shaft is, through a first coupling, connectable to the seventh shaft connected to the sun gear of the third planetary gear set, which is connected to the bar of the first planetary gear set and is connectable to the fourth shaft through a third coupling, which is connected to the sun gear of the second planetary gear set and is attachable to the housing through a second brake. The input shaft is, through a second coupling, connectable to the eighth shaft connected to the sun gear of the fourth planetary gear set and the third shaft is connected to the ring gear of the first planetary gear set, the bar of the second planetary gear set, and the ring gear of the fourth planetary gear set, and is attachable to the housing through a first brake. The sixth shaft is connected to the ring gear of the second planetary gear set and the ring gear of the third planetary gear set. The output shaft is connected to the bar of the third planetary gear set and the bar of the fourth planetary gear set.

7 Claims, 2 Drawing Sheets

(56) References Cited

U.S. PATENT DOCUMENTS

| | | | | |
|---|---|---|---|---|
| 4,038,888 | A | * | 8/1977 | Murakami .............. F16H 3/666 475/276 |
| 4,089,239 | A | * | 5/1978 | Murakami ................ F16H 3/66 475/276 |
| 7,854,678 | B2 | | 12/2010 | Kim |
| 8,801,563 | B2 | | 8/2014 | Ohnemus et al. |
| 2010/0144486 | A1 | | 6/2010 | Hart et al. |
| 2010/0227729 | A1 | | 9/2010 | Wittkopp et al. |

OTHER PUBLICATIONS

PCT Search Report, Jul. 24, 2013.

* cited by examiner

| Gear | Engaged Shifting Elements ||||||  Ratio i | Gear Step φ |
|------|----|----|----|----|----|----|----|----|
|      | Brake ||| Clutch ||| | |
|      | 03 | 04 | 05 | 17 | 18 | 47 | | |
| 1    | X  | X  |    | X  |    |    | 4,900 |       |
|      |    |    |    |    |    |    |       | 1,545 |
| 2    | X  |    |    | X  | X  |    | 3,172 |       |
|      |    |    |    |    |    |    |       | 1,448 |
| 3    |    | X  |    | X  | X  |    | 2,190 |       |
|      |    |    |    |    |    |    |       | 1,382 |
| 4    |    | X  | X  |    | X  |    | 1,585 |       |
|      |    |    |    |    |    |    |       | 1,135 |
| 5    |    | X  |    |    | X  | X  | 1,396 |       |
|      |    |    |    |    |    |    |       | 1,235 |
| 6    |    |    | X  |    | X  | X  | 1,130 |       |
|      |    |    |    |    |    |    |       | 1,130 |
| 7    |    |    |    | X  | X  | X  | 1,000 |       |
|      |    |    |    |    |    |    |       | 1,274 |
| 8    |    |    | X  | X  | X  |    | 0,785 |       |
|      |    |    |    |    |    |    |       | 1,170 |
| 9    |    |    | X  | X  |    | X  | 0,671 |       |
|      |    |    |    |    |    |    |       | 1,285 |
| 10   |    | X  | X  | X  |    |    | 0,522 |       |
| R    | X  |    |    | X  |    | X  | -4,486 | Total 9,387 |

| 2.1 | X | X |   |   | X |   | 3,172 |
| 2.2 | X |   | X |   | X |   | 3,172 |
| 2.3 | X |   |   |   | X | X | 3,172 |

Fig. 2

MULTI-SPEED GEARBOX

FIELD OF THE INVENTION

The present invention relates to a multi-speed transmission having a planetary design, in particular an automatic transmission for a motor vehicle.

BACKGROUND

According to the state of the art, automatic transmissions, in particular for motor vehicles, comprise planetary gear sets that are shifted by means of friction elements or shifting elements and are typically connected to a start-up element that is subject to a slip effect and is alternatively provided with a lock-up clutch, such as a hydrodynamic torque converter or a fluid coupling.

In general, automatically shiftable vehicle transmissions in planetary design are already described in the state of the art, and are subject to continuous development and improvement. Thus, such transmissions should require low construction costs, in particular a small number of shifting elements, and, upon a sequential shifting operation, should avoid double gearshifts, i.e. the switching on and off of two shifting elements, such that, during gearshifts in defined gear groups, only one shifting element is changed. In addition, fuel consumption should be reduced by means of such transmissions. This may occur, on the one hand, by reducing internal transmission losses and, on the other hand, by operating the internal combustion engine at the ideal operating point. In order to run the internal combustion engine at its ideal operating point, it is particularly important to, with a large gear spread, realize small gear steps, which results in the increase in the number of gears.

DE10 2008 064 113 A1 shows a transmission arrangement of an automatic transmission for a motor vehicle comprising ten forward gears, which features a first planetary transmission, which is designed as a simple planetary transmission, and features a first rotating element, which acts as a fixed element, a second rotating element, which provides a reduced rotation speed, and a third rotating element, which is directly connected to an input shaft and acts as an input element. The known transmission also comprises a second simple planetary gear, which features a fourth rotating element, which is directly connected to the second rotating element, a fifth rotating element, which is optionally connected to a transmission housing by inserting a first brake, and a sixth rotating element, which is optionally connected to a transmission housing by inserting a second brake, whereas a first coupling optionally connects at least two rotating elements of the fourth, fifth and sixth rotating elements. Furthermore, a third planetary transmission composed of one planetary transmission with a single pinion and one planetary transmission with a double pinion is provided; this features a seventh rotating element, which is directly connected to the sixth rotating element, an eighth rotating element, which is optionally connected to the input shaft by inserting a second coupling and is optionally connected to the transmission housing by inserting a third brake, a ninth rotating element, which is connected to an output shaft, and a tenth rotating element, which is connected to the fourth rotating element by inserting a third coupling, whereas a fourth coupling is arranged between the seventh rotating element and the eighth rotating element.

For transmission concepts with a high number of gears, the problem arises that the number of transmission components and thus the construction costs greatly increase, depending on the number of gears. In addition, due to the higher number of transmission components, the internal efficiency of the transmission decreases, such that the optimization of consumption is partially compensated through the high number of gears.

SUMMARY OF THE INVENTION

The present invention is subject to a task of proposing a multi-speed transmission of the aforementioned type, which features at least ten forward gears and one reverse gear and a large spread, for which the construction costs, the component load and the component size are optimized, and which also improves efficiency regarding the drag losses and gearing losses. Additional objects and advantages of the invention will be set forth in part in the following description, or may be obvious from the description, or may be learned through practice of the invention.

In accordance with the invention, the tasks are solved by the characteristics of a transmission described and claimed herein.

Accordingly, a multi-speed transmission in planetary design in accordance with the invention is proposed, which features an input and an output, which are arranged in a housing. Furthermore, at least four planetary gear sets, hereafter referred to as the first, second, third and fourth planetary gear sets, eight rotatable shafts—hereafter referred to as the input shaft, output shaft, third, fourth, fifth, sixth, seventh and eighth shafts—along with six shifting elements preferably designed as multi-disk shifting elements or as positive-locking shifting elements, comprising brakes and couplings, are provided; their selective intervening brings about different transmission ratio relationships between the input and the output, such that, preferably, ten forward gears and one reverse gear are able to be realized.

The planetary gear sets of the transmission are preferably formed as negative planetary gear sets.

As is well known, a simple negative planetary gear set comprises a sun gear, a ring gear and a bar, on which the planetary gears are rotatably mounted, each of which meshes with the sun gear and the ring gear. Thereby, with a bar that is held down, the ring gear exhibits a direction of rotation opposite to the sun gear, and a negative stationary transmission ratio arises. By contrast, a simple positive planetary gear set comprises a sun gear, a ring gear and a bar, on which the inner and outer planetary gears are rotatably mounted, whereas all inner planetary gears mesh with the sun gear, and all outer planetary gears mesh with the ring gear, whereas each inner planetary gear meshes with each outer planetary gear. Thereby, with a bar that is held down, the ring gear exhibits the same direction of rotation as the sun gear, and a positive stationary transmission ratio arises.

In accordance with the invention, the sun gear of the first planetary gear set is connected to the fifth shaft, which is attachable to the housing through a third brake, whereas the input shaft is, through a first coupling, detachably connectable to the seventh shaft connected to the sun gear of the third planetary gear set, which is connected to the bar of the first planetary gear set and is detachably connectable to the fourth shaft through a third coupling, whereas the fourth shaft is connected to the sun gear of the second planetary gear set and is attachable to the housing through a second brake. The third coupling is preferably arranged near the housing.

Furthermore, the input shaft of the transmission is, through a second coupling, detachably connectable to the eighth shaft connected to the sun gear of the fourth planetary gear set, whereas the third shaft is connected to the ring gear of the first planetary gear set, the bar of the second planetary gear set and the ring gear of the fourth planetary gear set, and is attachable to the housing through a first brake.

In addition, the sixth shaft is connected to the ring gear of the second planetary gear set and the ring gear of the third planetary gear set, whereas the output shaft of the transmission is connected to the bar of the third planetary gear set and the bar of the fourth planetary gear set.

By the fact that the first and second coupling are arranged on the input shaft of the transmission, the third coupling may be arranged close to the housing and the remaining shifting elements are designed as brakes, the easy accessibility of all shifting elements of the transmission is ensured, by which the shifting elements can be designed as actuatable shifting elements in line with demand.

The arrangement of the multi-speed transmission in accordance with the invention gives rise to transmission ratios particularly suitable for passenger cars along with an increased overall spread of the multi-speed transmission, which results in an improvement in driving comfort and a significant reduction in consumption.

Moreover, with the multi-speed transmission in accordance with the invention, construction costs are significantly reduced, due to the low number of shifting elements. In an advantageous manner, with the multi-speed transmission in accordance with the invention, it is possible to perform a start with a hydrodynamic converter, an external starting clutch, or other suitable external start-up elements. It is also possible to facilitate the start-up procedure with a start-up element integrated into the transmission. A shifting element that is actuated in the first forward gear and in the reverse gear is preferably suitable.

Furthermore, the multi-speed transmission in accordance with the invention gives rise to good efficiency in the main driving gears, based on the low drag losses and gearing losses.

In an advantageous manner, there are low torques on the shifting elements and on the planetary gear sets of the multi-speed transmission, which reduces the load for the multi-speed transmission in an advantageous manner. In addition, the low torques enable correspondingly low dimensioning, which reduces the required installation space and the corresponding costs. Furthermore, there are also low rotational speeds for the shafts, the shifting elements and the planetary gear sets.

In addition, the transmission in accordance with the invention is designed in such a manner that adaptability to the various drive train arrangements is enabled, both in the direction of the power flow and in spatial terms. The transmission may be incorporated, for example, in front-cross design, or within the framework of a standard drive.

BRIEF DESCRIPTION OF THE DRAWINGS

In the following, the invention is more specifically illustrated as an example on the basis of the attached figures. The following are represented in these:

FIG. 2: an exemplary circuit diagram for a multi-speed transmission in accordance with FIG. 1.

DETAILED DESCRIPTION

Figure 1:
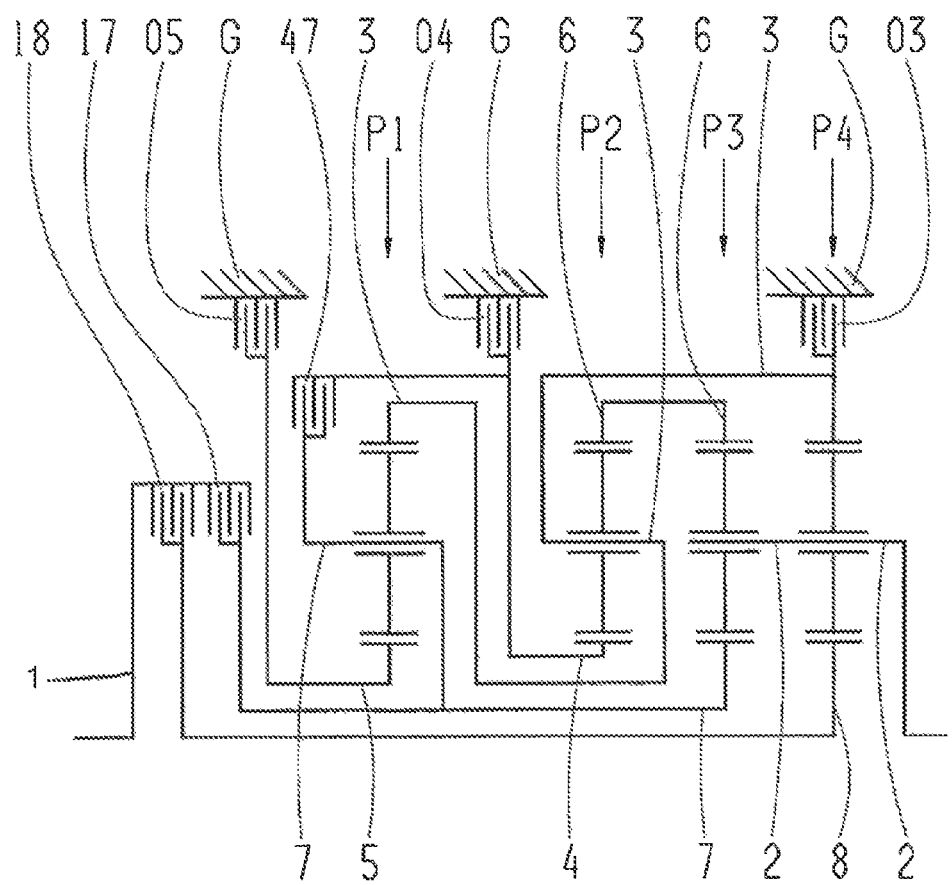
FIG. 1: a schematic view of a preferred embodiment of a multi-speed transmission in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a multi-speed transmission in accordance with the invention with an input shaft 1, an output shaft 2 and four planetary gear sets P1, P2, P3 and P4, which are arranged in a housing G. In the example shown in FIG. 1, the planetary gear sets P1, P2, P3, P4 are formed as negative planetary gear sets. In accordance with the invention, at least one of the planetary gear sets P1, P2, P3, P4 may be designed as a positive planetary gear set, if, at the same time, the bar connection and the ring gear connection are exchanged, and the amount of the stationary transmission ratio is increased by 1 compared to the design as a negative planetary gear set.

With the embodiment that is shown, the planetary gear sets P1, P2, P3, P4 are arranged, viewed axially, in the order of the first planetary gear set P1, the second planetary gear set P2, the third planetary gear set P3, the fourth planetary gear set P4. In accordance with the invention, the axial order of the individual planetary gear sets and the arrangement of the shifting elements are freely selectable, as long as this allows for the binding ability of the elements.

As shown in FIG. 1, six elements, namely three brakes 03, 04, 05 and three couplings 17, 18, 47, are provided. The spatial arrangement of the shifting elements may be arbitrary, and is limited only by the dimensions and the external shaping. The couplings and brakes of the transmission are preferably designed as frictional shifting elements or multi-disk shifting elements, but may also be designed as positive-locking shifting elements.

With these shifting elements, a selective shifting of at least ten forward gears and one reverse gear can be realized. The multi-speed transmission in accordance with the invention features a total of eight rotatable shafts, namely the shafts 1, 2, 3, 4, 5, 6, 7 and 8, whereas the input shaft forms the first shaft 1 and the output shaft forms the second shaft 2 of the transmission.

With the multi-speed transmission in accordance with FIG. 1, it is provided that the sun gear of the first planetary gear set P1 is connected to the fifth shaft 5, which is attachable to the housing G through a third brake 05, whereas the input shaft 1 is, through a first coupling 17, detachably connectable to the seventh shaft 7 connected to the sun gear of the third planetary gear set P3, which is connected to the bar of the first planetary gear set P1 and is detachably connectable to the fourth shaft 4 through a third coupling 47. The fourth shaft 4 is connected to the sun gear of the second planetary gear set P2 and is attachable to the housing through a second brake 04.

With reference to FIG. 1, the input shaft 1 of the transmission is, through a second coupling 18, detachably connectable to the eighth shaft 8 connectable to the sun gear of the fourth planetary gear set P4, whereas the third shaft 3 is connected to the ring gear of the first planetary gear set P1, the bar of the second planetary gear set P2 and the ring gear of the fourth planetary gear set P4 and is attachable to the housing G of the transmission through a first brake 03.

In the illustrated embodiment, the sixth shaft 6 is connected to the ring gear of the second planetary gear set P2 and the ring gear of the third planetary gear set P3, whereas the output shaft 2 is connected to the bar of the third planetary gear set P3 and the bar of the fourth planetary gear set P4.

With the embodiment that is shown, the first brake 03 is particularly suitable for a design as a claw shifting element, by which consumption is significantly improved.

FIG. 2 shows an exemplary circuit diagram of a multi-speed transmission in accordance with FIG. 1. For each gear, three shifting elements are closed. As an example, the respective transmission ratios i of the individual gears and the gear steps or progressive steps φ, to be determined from these, for the next higher gear can be seen in the circuit diagram, whereas the value 9.387 represents the spread of the transmission.

For the example shown, the values for the stationary transmission ratios of the planetary gear sets P1, P2, P3, P4, designed as negative planetary gear sets, are −2.50, −1.86, −3.90 and −2.17, respectively. FIG. 2 shows that, upon a sequential shifting operation, only one shifting element must be switched on, and only one shifting element must be switched off, since two adjacent gears jointly use two shifting elements. It also shows that a large spread is achieved with small gear steps.

The first forward gear arises from the locking of the first and second brakes 03, 04 and the first coupling 17, the second forward gear arises from the locking of the first brake 03 and the first and second couplings 17, 18, the third forward gear arises from the locking of the second brake 04 and the first and second couplings 17, 18, the fourth forward gear arises from the locking of the second and third brakes 04, 05 and the second coupling 18, the fifth forward gear arises from the locking of the second brake 04 and the second and third couplings 18, 47, the sixth forward gear arises from the locking of the third brake 05 and the second and third couplings 18, 47, the seventh forward gear, which in the example shown is designed as a direct gear, arises from the locking of the first, second and third couplings 17, 18, 47, the eighth forward gear arises from the locking of the third brake 05 and the first and second couplings 17, 18, the ninth forward gear arises from the locking of the third brake 05 and the first and third couplings 17, 47 and the tenth forward gear arises from the locking of the second and third brakes 04, 05 and the first coupling 17, whereas the reverse gear arises from the locking of the first brake 03 and the first and third couplings 17, 47.

Alternatively, the second forward gear can be shifted by additional shifting combinations, which in FIG. 2 are designated with 2.1, 2.2 and 2.3. Accordingly, the second forward gear may arise from the locking of the first and second brakes 03, 04 and the second coupling 18, or from the locking of the first and third brakes 03, 05 and the second coupling 18, or from the locking of the first brake 03 and the second and third coupling 18, 47.

By the fact that, in the first forward gear and in the reverse gear, the first brake 03 and the first coupling 17 are closed, these shifting elements may be used as start-up elements.

In accordance with the invention, even with the same transmission scheme, different gear steps arise depending on the shifting logic, such that an application-specific or vehicle-specific variation is enabled.

It is also optionally possible to provide additional freewheels at each suitable location of the multi-speed transmission, for example between one shaft and the housing, or, if applicable, in order to connect two shafts.

An axle differential and/or a distributor differential may be arranged on the input side or on the output side.

Within the framework of an advantageous additional embodiment, if necessary, the input shaft 1 may be separated from the drive motor by a coupling element, whereas a hydrodynamic converter, a hydraulic clutch, a dry starting clutch, a wet starting clutch, a magnetic powder clutch or a centrifugal clutch may be used as the coupling element. It is also possible to arrange such a start-up element in the direction of the power flow behind the transmission, whereas, in this case, the input shaft 1 is constantly connected to the crankshaft of the drive motor.

The multi-speed transmission in accordance with the invention also allows for the arrangement of a torsional vibration damper between the drive motor and the transmission.

Within the framework of an additional embodiment that is not shown, a wear-free brake, such as a hydraulic retarder or an electric retarder or the like, may be arranged at each shaft, preferably at the input shaft 1 or the output shaft 2; this is of particular importance for use in commercial vehicles. Furthermore, a power take-off may be provided for the drive of additional power units at each shaft, preferably at the input shaft 1 or the output shaft 2.

The frictional shifting elements that are used may be formed as power-shiftable couplings or brakes. In particular, force-fitting couplings or brakes, such as multi-disk couplings, band brakes and/or cone couplings, may be used.

An additional advantage of the multi-speed transmission presented here is that an electric motor can be installed at each shaft as a generator and/or as an additional drive motor.

Modifications and variations can be made to the embodiments illustrated or described herein without departing from the scope and spirit of the invention as set forth in the appended claims.

The invention claimed is:

1. A multi-speed transmission having a planetary design and suitable for an automatic transmission for a motor vehicle, the transmission comprising:
   an input shaft, an output shaft and four planetary gear sets arranged in a housing;
   eight rotatable shafts;
   six shifting elements, wherein the shifting elements comprise brakes and couplings whose selective intervening brings about different transmission ratio relationships between the input shaft and the output shaft such that at least ten forward gears and one reverse gear are able to be realized;
   a sun gear of the first planetary gear set connected to a fifth shaft, which is attachable to the housing through a third brake;
   the input shaft, through a first coupling, detachably connectable to a seventh shaft that is connected to a sun gear of the third planetary gear set, which is connected to a bar of the first planetary gear set and is detachably connectable to a fourth shaft through a third coupling, the third coupling connected to a sun gear of the second planetary gear set and attachable to the housing through a second brake;
   the input shaft, through a second coupling, detachably connectable to an eighth shaft that is connected to a sun gear of the fourth planetary gear set;
   a third shaft connected to a ring gear of the first planetary gear set, a bar of the second planetary gear set and a ring gear of the fourth planetary gear set, the third shaft attachable to the housing through a first brake;
   a sixth shaft connected to a ring gear of the second planetary gear set and a ring gear of the third planetary gear set; and
   the output shaft connected to a bar of the third planetary gear set and a bar of the fourth planetary gear set.

2. The multi-speed transmission as in claim 1, wherein the planetary gear sets are formed as negative planetary gear sets.

3. The multi-speed transmission as in claim 1, wherein the planetary gear sets are arranged, viewed axially, in the order of the first planetary gear set, the second planetary gear set, the third planetary gear set, the fourth planetary gear set.

4. The multi-speed transmission as in claim 1, wherein the shifting elements are designed as demand actuated in-line shifting elements.

5. The multi-speed transmission as in claim 1, wherein the first brake is designed as a positive-locking shifting element.

6. The multi-speed transmission as in claim 1, wherein:
the first forward gear arises from locking of the first and second brakes and the first coupling;
the second forward gear arises from locking of the first brake and the first and second couplings;
the third forward gear arises from locking of the second brake and the first and second couplings;
the fourth forward gear arises from locking of the second and third brakes and the second coupling;
the fifth forward gear arises from locking of the second brake and the second and third couplings;
the sixth forward gear arises from locking of the third brake and the second and third couplings;
the seventh forward gear arises from locking of the first, second and third couplings;
the eighth forward gear arises from locking of the third brake and the first and second couplings;
the ninth forward gear arises from locking of the third brake and the first and third couplings;
the tenth forward gear arises from locking of the second and third brakes and the first coupling; and
the reverse gear arises from locking of the first brake and the first and third couplings.

7. The multi-speed transmission as in claim 6, wherein the second forward gear alternatively arises from locking of the first and second brakes and the second coupling, or from locking of the first and third brakes and the second coupling, or from locking of the first brake and the second and third coupling.

* * * * *